Feb. 14, 1939.  N. F. T. SAUNDERS ET AL  2,146,992
THERMOSTATICALLY CONTROLLED ELECTRICALLY HEATED IRON
Filed March 14, 1936  2 Sheets-Sheet 1

Inventors: N. F. T. SAUNDERS,
N. BARNES, F. J. MUDGE
by: J. Oppenheimer, atty.

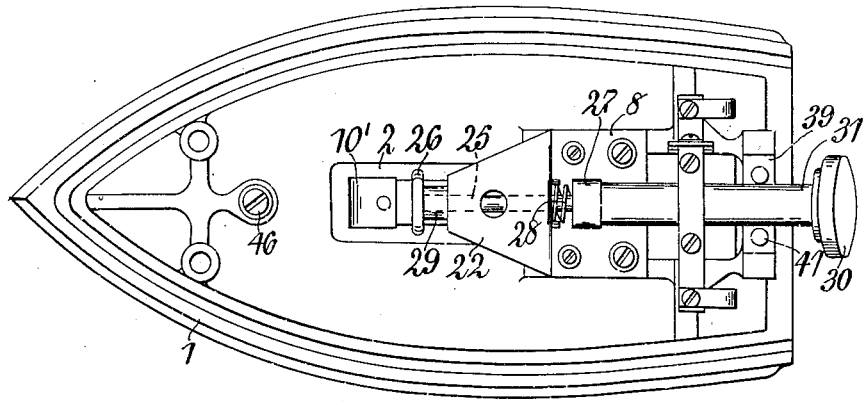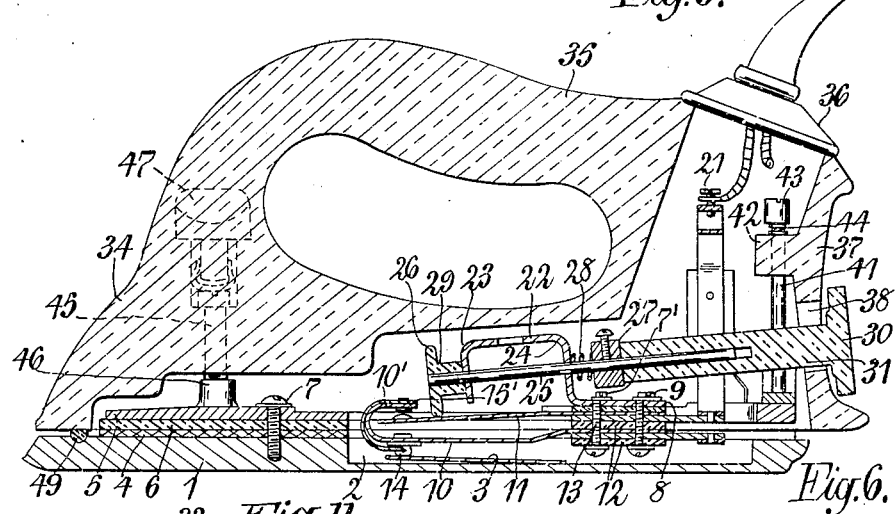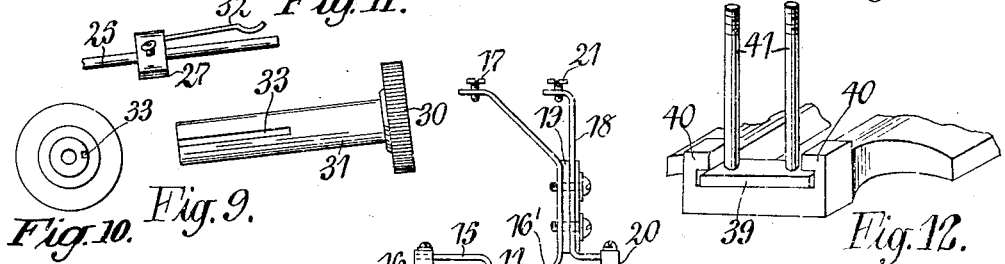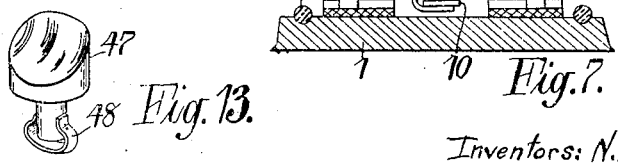

UNITED STATES PATENT OFFICE 2,146,992

THERMOSTATICALLY CONTROLLED ELECTRICALLY HEATED IRON

Norman Frank Tilbury Saunders, Ruislip, Norman Barnes, High Wycombe, and Frederick Joseph Mudge, Hillingdon, England, assignors to Electric & Musical Industries Limited, Hayes, England, a company of Great Britain Application March 14, 1936, Serial No. 68,836
In Great Britain March 19, 1935

12 Claims. (Cl. 219—25)

This invention relates to thermostatically controlled electrically heated irons and in particular irons of that kind in which a switch in the electrical heating circuit is opened and closed, as the temperature of the iron rises and falls, by a heat sensitive device such as a bi-metallic strip arranged within the iron.

In some irons of this kind already known, the arrangement of the heating elements and the thermostat is such that the latter is influenced not only by the temperature of the heated sole plate but also to a very considerable extent by heat radiated directly by the heating elements and by the general temperature conditions within the body of the iron and while these arrangements maintain the temperature of the body of the iron as a whole more or less constant, it is found that under load the temperature of the working surface of the sole plate tends to fall as the load is increased.

It will be readily understood that when an iron is under heavy load the heating current circuit should be closed for longer periods. With some known irons the thermostat control is such that the periods during which the heating circuit remains closed are, under such circumstances, somewhat lengthened, but under the direct influence of the heating elements and the body of the iron, which also under such circumstances of necessity becomes hotter, the heat sensitive device is nevertheless caused to open the switch before sufficient heat has been generated to wholly replace that extracted from the sole plate by the work. In some irons this resultant "working" drop in temperature of the sole plate is very considerable when the load is heavy and the temperature adjustments, which are usually effected when the iron is not under load, are rendered unreliable.

If the temperature setting is made by the operator so that the sole plate is at the desired working temperature when the iron is at rest, the temperature of the sole plate will fall below the desired working temperature when the iron is applied to the work, whilst, if the setting is such as to raise the temperature in the rest position higher, with a view to allowing for the working drop, the temperature of the iron when off the work may become excessive and dangerous.

Various attempts have been made to construct irons so that the direct effect of the heating element and of the body of the iron upon the heat sensitive control device is reduced, in order to reduce the "working" temperature drop, but it is found that arrangements directed to this end have hitherto given rise to a further difficulty in that the working surface tends to become excessively hot during the period when the iron is heating up from cold, with the resultant risk of damage to the work if the iron is applied during this initial heating up period.

This trouble arises in these known irons from the fact that the transfer of heat to the heat sensitive device takes place mainly by conduction through the sole plate and over a long heat path, so that the heat sensitive device is caused to heat up more slowly than the working surface and the latter therefore reaches an excessive temperature before the heat sensitive device is hot enough to open the switch in the heating circuit. This effect is also noticeable when the temperature setting of the iron is altered to raise the working temperature to a higher value.

The primary object of the present invention therefore, is to provide an iron in which the "working" temperature drop, even under heavy load, is kept within limits, the difference between which cannot be detected by the usual methods employed by an operator and in which the attainment of an excessive temperature by the sole plate when the iron is off the work is prevented.

A further object of the present invention is to provide an improved iron of the kind embodying heat sensitive means for opening and closing the electric heating circuit as the temperature of the iron varies and a manual control device whereby the temperature at which the switch is opened and closed may be varied to control the average temperature of the iron according to the nature of the work to be done, with a manual control which does not become excessively hot and which is located in a position where it does not interfere with the hand of the user.

In accordance with one feature of the invention there is provided an electrically heated iron the electric heating circuit of which contains a switch adapted to be opened and closed by a heat sensitive device contained within the iron and including two co-operating elements one of which is arranged in direct heat conducting connection with the sole plate of the iron so that its temperature changes are determined mainly by variations in temperature of the sole plate and the other of which is mounted and arranged so as to be effected by the general temperature of the space within the iron. The two elements are arranged to operate in opposite senses, that is to say, while a rise in temperature of the first element tends to open the switch in the heating circuit, a rise in temperature in the second element tends to maintain the switch closed.

Thus when the temperature within the body of the iron rises, as when the iron is under heavy load, the second element becomes correspondingly heated and functions to delay the opening of the switch by the first element until the heat taken from the working surface has been wholly replaced. On the other hand, during the preliminary heating up of the iron from cold, the second element heats up less rapidly than the first element and causes the switch to be opened earlier and before the sole plate has become excessively heated.

In accordance with another feature of the invention an electrically-heated flat iron of the kind indicated above is provided comprising a sole plate, a temperature control means, a movable element forming part of said control means within said iron, an elongated manual control device cooperating at one end with the said element, means for mounting said manual control device in substantially parallel relationship with the said sole, a body including a handle and formed to enable the other end of said elongated manual control device to extend therethrough; and to be disposed at a point to the rear of said handle for engagement by the operator.

The manual control member is formed wholly or partly of heat insulating material and a long and low heating conducting path is thus provided between the electric circuit controlling mechanism and the control knob or handle provided outside the body of the iron. The knob or handle of the control device being located to the rear of the handle of the iron, the hand of the user of the iron is not obstructed or interfered with.

Two embodiments of the invention are illustrated by way of example in the accompanying drawings, in which Fig. 1 is a plan view of the improved iron with the top or body portion removed.

Fig. 5 is a plan view of a modified iron with the body removed.

Fig. 6 is a sectional side elevation of a complete iron shown in Fig. 5.

Fig. 7 is a rear end elevation with the body removed and Figs. 8, 9, 10, 11, 12, 13 show constructional details of the iron shown in Figs. 5 to 7.

Figure 1:
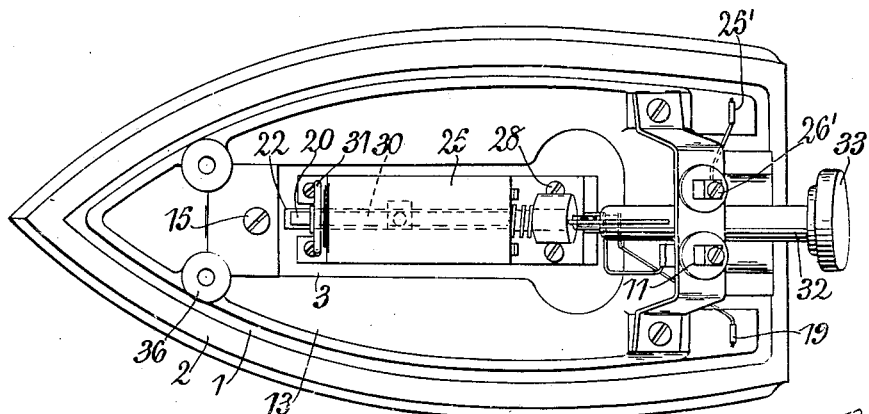

Referring to Figs. 1-4 of the drawings, 1 represents a sole plate of cast iron, brass, copper or other suitable material which may with advantage be somewhat thinner than the sole plates hitherto commonly used for electrically heated irons. This sole plate 1 is provided with a surrounding strengthening flange 2.

The inner surface of the sole plate 1 is recessed longitudinally in the region of its centre as shown at 3, and in this recess is located a bi-metallic strip 4, one end of said strip being anchored in intimate thermal contact with the sole plate, being held in position by a block 5 of insulating material, while the other end of said strip 4 is bent so as normally to be slightly spaced from the sole plate 1. The free end of strip 4 carries a U-shaped member 6 of metal so mounted that the limbs of the U extend across and are parallel to the strip 4. The member 6 is insulated from strip 4, mounting being effected by clamping one limb of member 6 between a lower strip of mica or the like 7 and an upper insulating block 8 and riveting the mica 7 and block 8 to the bi-metallic strip 4. The strip 4 is arranged so that its free end bends upwards and raises U-shaped member 6 when the temperature of the strip 4 rises. On the underside of the upper limb of member 6 is provided a contact stud 9 and the member 6 is itself connected through thin corrugated metal conductors 10, such as will offer a minimum of resistance to movement of the end of strip 4, to one of the current supply terminals 11.

The heating element 12 may be of usual form comprising a coil of resistance wire enclosed between two sheets of mica centrally apertured so that the element may lie close to the inner surface of the sole plate 1 within flange 2 and around the central recess 3 in said sole plate. The heating element 12 is clamped to the sole plate 1 by means of a flat metal weight 13 preferably with the interposition of a sheet of asbestos 14, fixing being effected by screws 15 passed through the weight 13 into suitable threaded bosses 16 provided on the sole plate 1. It will readily be seen that with this arrangement the bi-metallic strip 4 is to a large extent shielded from direct heat radiation from the element 12 and the shielding is also assisted to some extent by the location of the strip 4 in the recess 3 in the sole plate.

Above the insulating block 5 anchoring the strip 4, is mounted one end of a flexible metal strip 17, anchorage being effected by means of a further insulating block 18 and the anchored end of this strip 17 is electrically connected with one terminal 19 of the heating element 12.

Beneath the free end of flexible strip 17 is fixed a bi-metallic extension strip 20, said extension strip being arranged between two strips 21 and 22 of mica and the whole riveted to the end of strip 17.

The bi-metallic extension strip 20 is further from the sole plate 1 and the heating element 12 than the first mentioned bi-metallic strip 4, so that it is less directly influenced by changes of temperature in the sole plate. The mica strip 21 serves to prevent or reduce heat transfer by conduction from strip 17 to strip 20 and the mica strip 22 serves to shield strip 20 from heat radiated from heating element 12. The bi-metallic strip 20 is arranged so that its free end tends to bend downwards as it becomes hotter.

On the upper side of the end of strip 17 is mounted a metal plate 23 bearing a contact stud 24 for engagement with stud 9 on U-shaped member 6.

The electrical circuit is completed by connecting the other terminal 25' of heating element 12 with the other heating supply lead 26'.

The flexible metal strip 17 is given an upward set so that contacts 9 and 24 may be kept together over a given range of movement of the bi-metallic strips 4 and 20 and until temperature conditions become such as to require the heating circuit to be broken.

Over the parts so far described is mounted a metal yoke 25 disposed longitudinally of the iron the front end being slotted for the passage of the bi-metallic extension strip 20 and the parts of the yoke at each side of the slot being screwed to bosses 26 provided on the sole plate 1. The rear end of the yoke 25 seats upon a strip of insulating material 27 placed above the ends of conductors 10 on insulating block 18. The yoke 25, is somewhat wider than the blocks 18 and 5, and bolts 28 passed through the rear end of said yoke 25 and into bosses 29 on the sole plate 1 serve to maintain the yoke 25, insulating strip 27, conductors 10, block 18, flexible metal strip 17, block 5 and bi-metallic strip 4 in position.

The front and rear ends of the yoke 25 are apertured to form bearings for a horizontal or slightly inclined spindle 30 the forward end of which bears a snail cam 31 formed of insulating material and adapted to engage the free end of bi-metallic extension strip 20.

The rear end of spindle 30 extends towards the rear of the iron and is formed to receive the shank 32 of a control knob 33 formed of heat insulating material, and arranged close to the rear wall of the body 34 of the iron with the shank 32 extending through a hole in said body into the interior of the iron.

A spring 38 carried by a collar 39 fast on spindle 30 may be arranged to engage in a groove 40 in shank 32 to effect driving engagement between spindle 30 and control knob 33.

Any convenient form of iron body 34 may be used, but in the embodiment shown a body and handle is formed of a one piece moulding of glass, porcelain or other low heat conducting mouldable material. A glass or porcelain body, for example, possesses the advantage that its own weight renders unnecessary the use within the iron of large metal weights which might adversely affect the temperatures of the bi-metallic controlling members.

The body may be secured to the sole plate in any convenient manner as for example by means of bolts 35 engaged in recesses in the iron body and screwed into bosses 36 extending upwards from the sole plate 1. The recesses in the iron body may be filled by thumb pieces 37 of suitable material which while concealing the ends of the bolts 35, afford ready access thereto in case of necessity.

In use the control knob 33, which may bear indications such as "High", "Medium" and "Low", according to the temperature to which the iron is to be heated for the work in hand, is rotated and the snail cam 31 on the spindle 30 thereby set to form a stop to limit the upper position of the bi-metallic extension 20 on the flexible metal strip 17 as required.

Figure 2:
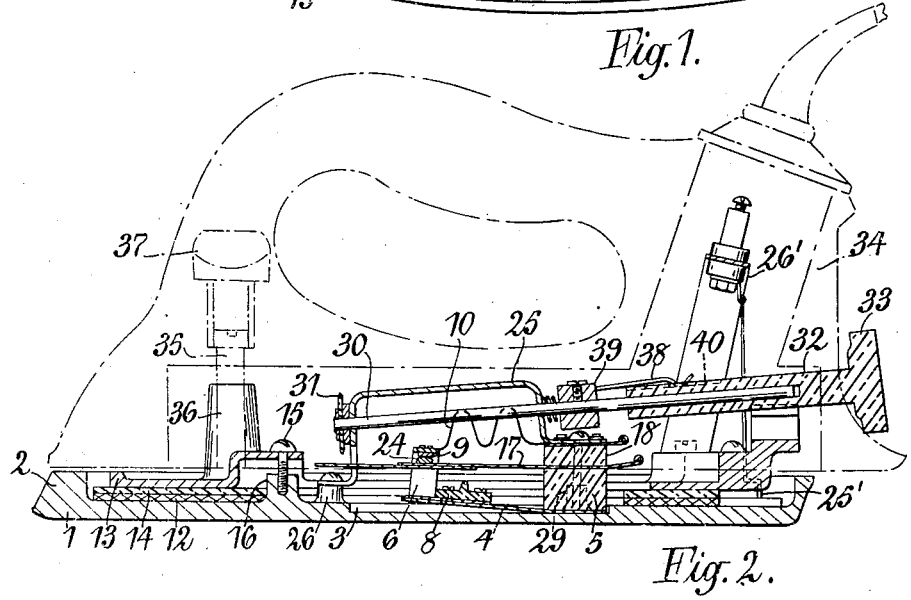
Fig. 2 is a sectional side elevation on the centre line of Fig. 1 the outline of the top or body of the iron being shown in dotted lines and Fig. 3 is a side view on a larger scale showing the arrangement of the temperature controlling parts.

While the iron is cold the cam does not contact with the bi-metallic extension strip 20 so that the contact studs 9 and 24 remain together as shown in Fig. 2.

If now the current is switched on the heating element 12 becomes hot and transmits heat to the sole plate 1. The first mentioned bi-metallic strip 4 being anchored with one end in contact with the sole plate 1 commences to heat up also by conduction.

In an ideal thermostatically controlled iron the heat sensitive device would at all times be at the same temperature as the working surface of the sole plate, but in existing irons the thermostat control, which is of necessity contained within the body, is considerably affected by temperatures obtaining therein and in such a manner as to give rise to difficulties indicated above.

With the improved iron according to the present invention during the preliminary heating up period the temperature rise in bi-metallic strip 4 lags with regard to the temperature rise of the working surface of sole plate 1. As the end of strip 4 with U shaped member 6 rises, however, the second bi-metallic strip 20 on the end of flexible metal strip 17 rises also under the lift imparted by the latter and so contacts 9 and 24 remain together and the heating circuit remains closed until the end of bi-metallic strip 20 engages cam 31.

During this preliminary heating period however, the bi-metallic extension strip 20 which is insulated from the sole plate 1 and shielded from direct radiation by heating element 12 heats up more slowly than the main bi-metallic element 4. The arrangement is such that during this period the extremity of strip 20 is bent upwards relatively to its position when hot as under the latter working conditions, and it therefore contacts sooner with the cam 31 and the contacts 9 and 24 are parted earlier and before the working surface of the sole plate 1 has reached an excessive temperature.

As the whole iron warms up, the bi-metallic extension 20 bends downwards to gradually vary or delay the point at which contacts 9 and 24 open so that after two or three cycles the normal conditions appropriate to the setting for the working conditions is reached. During these cycles, the sole plate temperature is kept within limits, the difference between which cannot be detected by the methods usually employed by an operator.

In use under heavy load when the switch contacts 9 and 24 remain closed for long periods due to rapid extraction of heat from the sole plate 1, the temperature in the interior of the body of the iron and therefore that of bi-metallic extension strip 20 becomes higher, and under these conditions the end of bi-metallic extension strip 20 bends downwards so that contact with the cam 31 takes place later and the opening of the switch 9, 24 is delayed, thereby enabling the higher temperature within the body of the iron which must necessarily exist during the rapid transfer of heat to the working surface, to be maintained.

It is found that by using a heat sensitive control means such as that described above and a thinner sole plate than has hitherto been used, the fluctuations in temperature of the working surface when the iron is in use and the control appropriately set are kept within such close limits as to be incapable of detection by the methods employed by the ordinary user.

The arrangement of the control knob 33 at the rear of the iron body 34 as described, possesses, the advantage that it cannot contact with the fingers of the user when gripping the handle, and a long heat path is provided between the mounted end of the spindle 30 and the knob 33 so that the latter cannot become excessively hot.

While in the above described arrangement the heat sensitive controlling elements are in the form of bi-metallic strips, it will be understood that other forms of heat sensitive element may be employed.

For example, one or both of the bi-metallic members 4 and 20 described above may be substituted by one or more flexible capsules in the form of sealed corrugated gas containing bellows which expand or contract as the temperatures vary, to operate the switch contacts.

In the form of iron shown in Figs. 5–13, a sole plate 1 is provided with a central longitudinal recess 2 in which is mounted a bi-metallic strip 3 anchored at the end towards the rear end of the iron as for example by spot welding.

A heating element which may comprise a winding on a mica or like former and sandwiched between insulating strips, the whole being enclosed in a flat envelope 4 of metal such as steel, is mounted in contact with the upper surface of the sole plate 1, being clamped in position through a metal clamping plate 5 preferably with the interposition of a sheet 6 of asbestos. The clamping plate 5 is held down by means of bolts or screws 7 7' taking into the sole plate 1.

The heating element 4, asbestos sheet 6 and clamping plate 5 are also longitudinally slotted at the centre and in the space formed by these slots is housed the automatic switch in the electrical heating circuit of the iron.

This switch and its mounting are constructed as follows:—

Across the rear end of the slot in clamping plate 5 is mounted a bridging plate 8, said plate being held in position by the rear screws 7' and further screws 9 taking into the clamping plate.

To the under side of the bridging plate 8 are secured two spring metal strips 10 and 11 which are insulated from one another and from the bridging plate 8 by the interposition of strips 12 of insulating material, the parts being held assembled by means of screws 13.

The metal strips 10 and 11 extend forwardly of the iron within the central slots in base plate 1, heating element 4, asbestos sheet 6 and clamping plate 5, and the end of lower strip 10 is bent upwards and rearwards as shown at 10' to embrace the free end of the upper strip 11.

Strip 10 is provided on its underside with an insulating stud 14 for engagement with the free end of bi-metallic strip 3 and its rearwardly turned extremity bears a contact stud 15' for engagement with the free end of strip 11.

The free end of lower strip 10 is biased downwards and the free end of upper 11 upwards, so that the switch contacts tend to remain closed.

The rear end of lower strip 10 is clamped in contact with a metal connecting piece 15 which in turn is connected through a strip 16 with one end of the winding of the heating element 4.

The rear end of the upper strip 11 is clamped in contact with a metal connecting piece 16' which extends upwardly to a point convenient for the connection of one of the supply leads thereto by means of screw 17. A further upstanding strip 18 is connected with strip 16' with the interposition of insulating material 19, this strip 18 at its lower end being connected through a further metal strip 20 with the other end of the winding of the heating element 4, whilst its upper end is adapted for the connection of the other supply lead through screw 21.

The means whereby the mean temperature of the iron may be controlled at the will of the operator will now be described.

Figure 4:
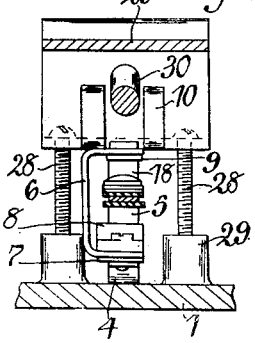
Fig. 4 is a sectional elevation on the line 4—4 of Fig. 3.
Figure 3:
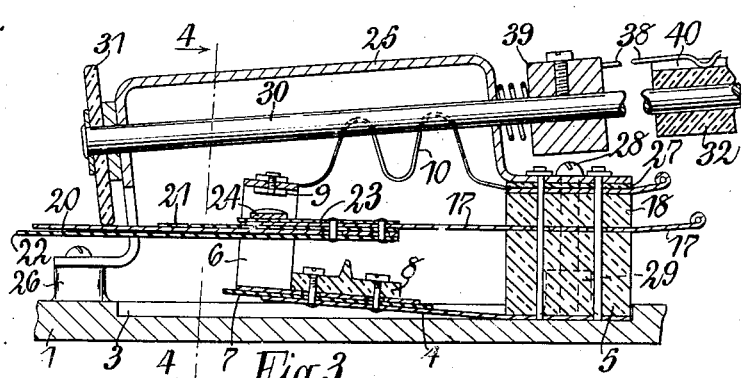

The forward end of bridging plate 8 is provided with an extension 22 which is of U-form in section, and the limbs 23, 24 of the U are apertured to form bearings for a metal spindle 25 arranged to extend longitudinally of the iron and on the forward end of which is fixedly mounted a snail cam 26 of a shape such as is shown in Fig. 4 and formed of insulating material. This cam 26 occupies a position where its periphery is adapted to be engaged by the upper switch strip 11. A collar 27 with a set screw is provided on the spindle 26 to the rear of limb 24 of extension 22 and a coiled spring 28 is provided between the collar 27 and limb 24 to maintain a boss 29 on the cam 26 in contact with the opposite limb 23 of extension 22 to maintain the cam 26 in a fixed plane and to hold it in a desired position frictionally when set by the operator.

The free end of spindle 25 extends towards the rear end of the iron and a long hollow shank 31 bearing a knob 30 and formed of heat insulating material is adapted to be engaged over the said spindle to rotate it. Driving engagement is provided by a spring 32 (Fig. 11) extending from the collar 27 fast on spindle 25 and engaging in a longitudinal groove 33 formed in the surface of shank 31.

The body 34 of the iron, together with the handle 35 is formed in the case illustrated of a one piece moulding of ceramic material, such as glass, porcelain, china or the like, the interior being shaped to provide space for the above described parts and including a housing at the rear end for the upstanding strips 16 and 18 for connection with the current supply leads. This housing may be closed by a cover 36 of any convenient form and fixed in position in any convenient manner. The rear wall 37 of the body is apertured as shown at 38 for the passage of the shank 31 of control knob or handle 30, said shank being inserted in the aperture 38 and applied over spindle 25 after the body of the iron has been secured to the sole plate.

Connection of the body 34 of the iron to the sole plate 1 may be effected by means of a bar 39 the ends of which engage between lugs 40 (Fig. 12) formed at the rear end of clamping plate 5, said bar bearing a pair of fixed bolts 41 which extend upwards and through apertures in a lug 42 provided on the inside of the rear wall of the body 34, nuts 43 with the interposition of springs 44 being applied to their upper ends.

At the front bolts 45 are passed down through the bottom of recesses formed in the body of the iron at each side of the handle into internally screw threaded bosses 46 on clamping plates 5. The recesses may be closed by means of stud 47 of heat insulating material preferably held in position by spring clips 48, so that they may be readily removed to give access to the bolts 45. These studs are shaped as shown in Fig. 13 to form thumb rests.

A strip 49 of resilient material such as asbestos string may be inserted between the sole plate 1 and iron body 34. In operation the heat of the sole plate 1 is transmitted by conduction to the bi-metallic strip 3 and the free end of the latter is caused to rise as the temperature of the sole plate increases.

The bi-metallic strip being in contact with stud 14, the free end of lower strip 10 is raised and owing to the upward set of strip 11 the latter remains in contact with stud 15 to maintain the heating circuit closed until strip 11 engages cam 26, whereupon further upward movement of strip 11 is prevented and the switch is opened.

As the sole plate cools the bi-metallic element 3 bends downwards and contact between stud 15 and strip 10 is re-established.

It will readily be seen that by rotation of the cam 26 through the control knob 30, the point in the upward movement of the end of bi-metallic strip 3 and therefore the temperature of the sole plate 1 at which the switch will open, can be varied at the will of the operator, and according to the nature of the work to be done.

The arrangement of the control knob 30 outside the body of the iron and behind the rear wall thereof permits a long heat conducting path between said knob 30 and the control cam 26 and the related parts situated near the centre of the iron so that the knob 30 does not become excessively hot. Furthermore, the locating of the knob is such that it does not get in the way of the fingers of the user as would be the case if it were mounted for example above the body of the iron and beneath the handle.

It will be understood that instead of a metal spindle 25 between cam 26 and the knob 30 and shank 31 of insulating material, a spindle 25 also of insulating material may be used.

The means employed for effecting driving engagement between knob 30 and spindle 25, comprising the adjustable collar 27 and springs 32 fast with said collar and engaging in the groove 33 in shank 31, offers the advantage that the setting of the cam 26 with regard to switch member 11 can be readily effected at the works and the knob 30 then arranged in appropriate position corresponding to the indicated heat conditions.

For this purpose the set screw in collar 27 is loosened and the spindle 25 rotated to bring the cam 26 into the desired position. Thereafter the collar 27 is rotated on the spindle to locate the spring 32 and the knob 30 so that markings on the latter are in proper relationship to a setting mark provided on the back wall of the iron body.

We claim:

1. A thermostatically controlled electrically heated iron, including a body having a sole plate, a switch for its heating circuit and control means for said switch, said control means comprising two cooperating heat sensitive elements, one of said elements disposed remote from said sole plate so as to be affected by the temperature conditions within said body but being substantially independent from electrical heating current if traversed thereby, the other one of said elements disposed adjacent to said sole plate in direct heat conducting relationship therewith.

2. A thermostatically controlled electrically heated iron including a body having a sole plate, a switch for its heating circuit comprising two contacts and a control means for said switch, said control means comprising two cooperating heat sensitive elements capable of changing their shape depending upon temperature changes, and mounted substantially parallel to each other and to said sole plate, one of said elements in direct heat conducting relationship with the latter and the other spaced therefrom and being substantially independent from electrical heating current if traversed thereby, said switch contacts carried by said elements, said elements arranged to move said contacts in opposite directions if the shape of said elements is changed under the influence of increasing or decreasing temperatures.

3. A thermostatically controlled electrically heated iron as in claim 2, including an adjustable stop disposed in the path of said second-mentioned element for varying the temperature setting of the iron.

4. A thermostatically controlled electrically heated iron, including a body, having a sole plate, a switch for its heating circuit and control means for said switch, said control means comprising a heat responsive device arranged adjacent to said sole plate in direct heat conducting relationship therewith, a support on said element, a switch contact on said support, a second heat responsive element arranged above said first mentioned element so as to be affected by the temperature conditions within said body, but being substantially independent from electrical heating current if traversed thereby, a switch contact carried by said second element adapted to engage the contact carried by said first mentioned element, an adjustable stop disposed in the path of said second mentioned element for limiting its upward movement in any one of a plurality of positions desired, and means within the reach of the operator for adjusting said stop.

5. In a thermostatically controlled electrically heated iron as described in claim 4, said adjustable stop comprising a cam arranged with its periphery in the path of said second mentioned element, a rotatable rod secured to and supporting said cam, a rotatable handle projecting from an end of said body and operatively connected with said rod.

6. In a thermostatically controlled electrically heated iron as described in claim 2, said heat sensitive elements each comprising a bi-metallic strip and a resilient member supporting the upper one of said strips, said resilient member having an upward bias whereby for a predetermined period said elements move in unison with one another.

7. A thermostatically controlled electrically heated iron including a body, having a sole plate, a switch for its heating circuit comprising two contacts and control means for said contacts, said control means comprising a bi-metallic strip mounted adjacent to said sole plate, said strip on one end in direct heat conducting relationship with said sole plate and carrying one of said contacts on its free end, said contact to be raised as the temperature of the strip increases, a flexible metal strip, one end of said metal strip anchored spaced from said sole plate and said body, and having an upward bias imparted thereto, the other one of said contacts carried by said metal strip and disposed in a position to be engaged by said first mentioned contact, a bi-metallic extension strip carried by said flexible metal strip, and an adjustable stop disposed in a position to be engaged by said last mentioned bi-metallic strip.

8. An electrically heated iron of the kind indicated comprising a sole plate and its temperature controlling means, a movable element forming part of said control means within said iron, an elongated manual control device, one end of which is adapted to co-operate with said element, said manual control device arranged substantially parallel to said sole plate said controlling means and manual device mounted on said sole plate, a body including a handle, the other end of said elongated manual control device extending through and beyond said body through an end thereof within reach of the operator.

9. An electrically heated flat iron according to claim 8, wherein the manual control device comprises a rotatable spindle arranged longitudinally within said iron, a cam fastened to the inner end of said spindle, said cam forming a stop for limiting the movement of said movable element.

10. An electrically heated flat iron comprising a sole plate and a handle, an elongated manual control device for varying the working temperature of the iron mounted on said sole plate, said manual control device arranged substantially parallel to said sole plate, a movable switch element adapted to be operated and to be brought to rest by said control device, said sole plate provided with a longitudinal recess, a bi-metallic strip anchored at one end of said recess, a second switch element operatively connected with the free end of said bi-metallic strip, said switch elements by their relative movement adapted to open or close their circuit after the first mentioned strip has been brought to rest.

11. An electrically heated iron according to claim 10 having a clamping plate, means for securing said plate to said sole plate, thereby clamping the heating element in position, means provided on said clamping plate to support switch bearing members for said control device and connecting strips for connection with the current supply leads.

12. An electrically heated flat iron according to claim 8, wherein the manual control device comprises a rotatable spindle, a cam fixed at one end thereof, a control knob carried by said spindle, a collar adjustably mounted on said spindle, a member fast on said collar and engaging a recess, or groove, in said knob, thereby coupling said knob and said spindle.

NORMAN FRANK TILBURY SAUNDERS.
NORMAN BARNES.
FREDERICK JOSEPH MUDGE.